(12) United States Patent
Verdonk

(10) Patent No.: US 6,681,119 B1
(45) Date of Patent: Jan. 20, 2004

(54) WIRELESS COMMUNICATION SYSTEM IN WHICH A CALL FROM A PRIVATE BRANCH EXCHANGE IS SELECTIVELY DELIVERED TO A MOBILE UNIT

(75) Inventor: Timothy C. Verdonk, Redmond, WA (US)

(73) Assignee: Nortel Networks Ltd, St. Laurent (CA)

( * ) Notice: Subject to any disclaimer, the term of this patent is extended or adjusted under 35 U.S.C. 154(b) by 0 days.

(21) Appl. No.: 09/280,260

(22) Filed: Mar. 29, 1999

Related U.S. Application Data

(63) Continuation-in-part of application No. 09/223,891, filed on Dec. 31, 1998.

(51) Int. Cl.$^7$ .............................. H04B 1/38; H04M 1/66
(52) U.S. Cl. ............... 455/555; 455/426.1; 455/462; 455/560; 455/554.1; 379/207.16; 379/373.02
(58) Field of Search ............................... 455/415, 417, 455/433, 445, 422, 425, 426.1, 426.2, 462, 550, 554.1, 555, 560, 567; 379/252, 201

(56) References Cited

U.S. PATENT DOCUMENTS

| | | | | |
|---|---|---|---|---|
| 4,488,004 A | * | 12/1984 | Bogart et al. ............... | 379/225 |
| 5,151,930 A | * | 9/1992 | Hagl ........................ | 455/31.3 |
| 5,511,111 A | * | 4/1996 | Serbetcioglu et al. .... | 379/88.01 |
| 5,548,636 A | * | 8/1996 | Bannister et al. .......... | 379/201 |
| 5,586,173 A | * | 12/1996 | Misholi et al. .......... | 379/88.13 |
| 5,696,817 A | * | 12/1997 | Yatsu ........................ | 379/252 |
| 5,699,407 A | * | 12/1997 | Nguyen ..................... | 455/462 |
| 5,771,275 A | * | 6/1998 | Brunner ..................... | 370/385 |
| 5,787,355 A | * | 7/1998 | Bannister et al. .......... | 455/458 |
| 5,822,416 A | * | 10/1998 | Goodacre et al. .......... | 379/142 |
| 5,926,537 A | * | 7/1999 | Birze ........................ | 379/252 |
| 6,014,377 A | * | 1/2000 | Gillespie .................... | 370/351 |
| 6,058,178 A | * | 5/2000 | McKendry et al. .... | 379/212.01 |
| 6,115,602 A | * | 9/2000 | Dee et al. .................. | 455/406 |
| 6,192,231 B1 | * | 2/2001 | Chapman et al. .......... | 455/401 |
| 6,212,395 B1 | * | 4/2001 | Lu et al. .................... | 455/463 |
| 6,223,055 B1 | * | 4/2001 | Cyr ............................ | 455/555 |
| 6,233,450 B1 | * | 5/2001 | Seppanen ................... | 455/426 |
| 6,256,512 B1 | * | 7/2001 | Verdonk ..................... | 455/554 |
| 6,278,874 B1 | * | 8/2001 | Verdonk ..................... | 455/408 |
| 6,314,298 B1 | * | 11/2001 | Hiroki ........................ | 455/465 |
| 6,332,075 B1 | * | 12/2001 | Verdonk ..................... | 455/408 |

* cited by examiner

*Primary Examiner*—Sinh Tran
*Assistant Examiner*—Kamran Afshar
(74) *Attorney, Agent, or Firm*—Bruce Garlick

(57) ABSTRACT

A wireless communication system constructed according to the present invention includes an originating mobile switching center (MSC), a home location register (HLR), a serving MSC and supporting infrastructure for each MSC. Such supporting infrastructure includes a plurality of base station controllers (BSC) and a plurality of base stations. The base stations support wireless communications within respective cells to service mobile units operating in the cells. When a call is received by the originating MSC intended for the mobile unit, the originating MSC determines whether the call originated from a private branch exchange. Such determination is made based upon whether the call was incoming on a designated trunk line or from a caller ID assigned to the private branch exchange. If the call originated from the private branch exchange, the call is competed and a distinctive ringing is provided to the mobile unit to indicate that the call originated at the private branch exchange. Alternatively, only calls that originated at the private branch exchange are completed to the mobile unit. In determining whether to route calls to the mobile unit, the HLR may investigate the subscriber preferences for the mobile unit.

21 Claims, 5 Drawing Sheets

WIRELESS COMMUNICATION SYSTEM IN WHICH A CALL FROM A PRIVATE BRANCH EXCHANGE IS SELECTIVELY DELIVERED TO A MOBILE UNIT

CROSS-REFERENCE TO RELATED APPLICATION

The present application is a continuation-in-part of, and claims priority pursuant to 35 U.S.C. Sec. 120 to U.S. application Ser. No. 09/223,891, filed Dec. 31, 1998, which is hereby incorporated herein by reference in its entirety.

BACKGROUND

1. Technical Field

The present invention relates generally to wireless communication systems; and more particularly to a wireless communication system in which a call is received by a mobile switching center from a private branch exchange for a mobile unit and in which the call is selectively routed to the mobile unit and, when the call is routed to the mobile unit, a distinctive alert signal is provided for the call.

2. Related Art

Cellular wireless communication systems are generally known in the art to facilitate wireless communications within respective service coverage areas. Such wireless communication systems include a "network infrastructure" that facilitates the wireless communications with mobile units operating within a service coverage area. The network infrastructure typically includes a plurality of base stations dispersed throughout the service coverage area, each of which supports wireless communications within a respective cell (or set of sectors). The base stations couple to base station controllers (BSCs), with each BSC serving a plurality of base stations. Each BSC couples to a mobile switching center (MSC) which also couples to the PSTN, the Internet and/or to other MSCs.

A wireless mobile unit operating within the service coverage area communicates with one or more of the base stations. The base stations route the communications to the MSC via a serving BSC. The MSC routes the communications to another subscribing wireless unit via a BSC/base station path (which may be the same BSC/base station path when the communications are with another subscribing unit serviced by the same base station) or via the PSTN/Internet/other network to terminating destination.

Various operating standards have been developed to standardize wireless communications. The wireless communication operating standards include, for example, the Advanced Mobile Phone Service (AMPS) standards, the Global Standards for Mobility (GSM), the Code Division Multiple Access (CDMA) and the Time Division Multiple Access (TDMA) standards. A standard that is employed in North America for interconnectivity of MSCs is the IS-41 standard. These operating standards set forth the technical requirements that facilitate compatible operation between equipment of differing vendors.

Mobile units are used for many differing applications. In many applications, they simply serve as telephones for their users. However, in other applications, they take the place of two-way radios. A particular example of such usage is when mobile units are provided to delivery or service personnel. The mobile units are used primarily for communication between a central office and the delivery or service personnel during normal working hours when the delivery or service personnel are in the field. When the mobile units are used for this purpose, however, problems may arise. For example, one problem arises when a service person is in the middle of a job and a call is incoming. The service person must cease his or her immediate activity to answer the phone. Valuable time is lost in answering phone calls that do not relate to the work performed by the service person. Another problem relates to the service personnel receiving unnecessary phone calls on his or her mobile unit. Since the mobile unit is provided by the employer, the employer may desire that the service person not receive calls from outside parties.

Thus, there is a need in the art for a wireless communication system in which calls to delivery or service personnel may be managed by a wireless communication system.

SUMMARY OF THE INVENTION

Thus, to overcome the shortcomings of the prior systems, among other shortcomings, a wireless communication system constructed according to the present invention determines whether an incoming call intended for a serviced mobile unit originated from a private branch exchange. In one operation, if the call originated from the private branch exchange, a distinctive ringing signal is used to alert the user of the mobile unit while calls originating from a non-private branch exchange source are terminated with a normal ringing cadence. In another operation, only calls that originate at the private branch exchange are completed to the mobile unit.

A wireless communication system constructed according to the present invention includes an originating mobile switching center (MSC), a home location register (HLR), a serving MSC and supporting infrastructure for each MSC. Such supporting infrastructure includes a plurality of base station controllers (BSC) and a plurality of base stations. The base stations support wireless communications within respective cells to service mobile units operating in the cells.

When a call is received by the originating MSC intended for the mobile unit, the originating MSC determines whether the call originated from a private branch exchange. Such determination is made based upon whether the call was incoming on a designated trunk line or from a caller ID assigned to the private branch exchange.

If the call originated from the private branch exchange, the call is competed and a distinctive ringing is provided to the mobile unit to indicate that the call originated at the private branch exchange. In such case, a user of the mobile unit, such as a delivery or service person may ignore calls that did not originate from the private branch exchange and receive calls that did originate from the private branch exchange. Calls that did not originate from a private branch exchange are completed normally.

Alternatively, only calls that originated at the private branch exchange are completed to the mobile unit. In determining whether to route calls to the mobile unit, the HLR may investigate the subscriber preferences for the mobile unit. By routing only those calls that originated at the private branch exchange, a delivery or service person will not receive calls on the mobile unit from other callers.

Moreover, other aspects of the present invention will become apparent with further reference to the drawings and specification which follow.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE DRAWINGS

Figure 1:
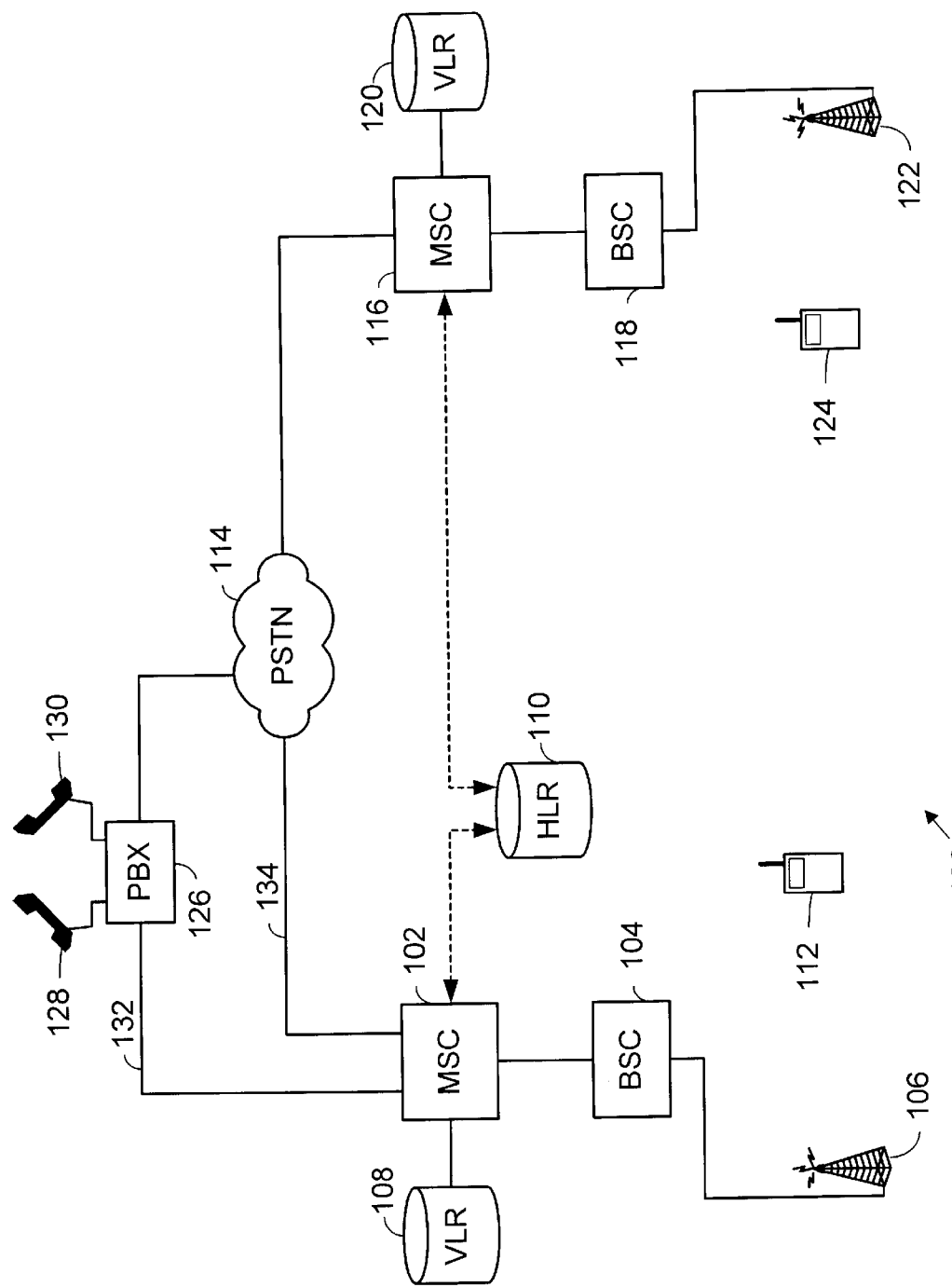
FIG. 1 is a system diagram illustrating generally the structure of a wireless communication system constructed according to the present invention.

FIG. 1 is a system diagram illustrating generally the structure of a wireless communication system constructed according to the present invention. The wireless communication system 100 includes mobile switching centers (MSCs) 102 and 116. Coupled to each MSC 102 and 116 is at least one base station controller (BSC). For example, BSC 104 is shown to be coupled to MSC 102 while BSC 118 is shown to be coupled to MSC 116. Finally, at least one base station couples to each BSC. As shown, base station 106 couples to BSC 104 and provides wireless service to mobile unit 112 while base station 122 couples to BSC 118 and provides wireless service to mobile unit 124. The construction of cellular based wireless communication systems is generally known. Thus, the structure of such cellular wireless communication systems will not be discussed other than to explain the teachings of the present invention. However, in a typical cellular wireless communication system, a plurality of base stations couple to each BSC and a plurality of BSCs couple to each MSC.

Each of the MSCs 102 and 116 is serviced by a visitor location register (VLR), 108 and 120, respectively. Further, each of the MSCs 102 and 116 couples to a home location register (HLR) 110 which stores subscriber information. The construction of VLRs and HLRs is also generally known. Thus, the operation of the VLRs and HLRs will not be discussed herein except as it applies to operation according to the present invention. A signaling path between the MSCs 102 and 116 and the HLR 110 is shown as a dotted line while the traffic paths between the MSCs 102 and 116 and the PSTN 114 are shown as solid lines. Communications between the MSCs 102 and 116 and the HLR 110 may be compliant with the IS-41 standard promulgated for North American intersystem operations.

Each of the MSCs 102 and 116 also couples to the public switched telephone network (PSTN) 114. The MSCs 102 and 116 may couple to other communication networks, such as the Internet, as well. The MSC 102 also couples to a private branch exchange (PBX) 126. The connection from the PBX 126 to the MSC 102 may be by way of a dedicated trunk line 132 or via the PSTN 114 by connection 134. In either case, the MSC 102 is able to identify that a call is made from the PBX 126 at extension 128 or 130. When the PBX 126 call is routed to the MSC 102 via the trunk line 132, the determination is easily made because the call is incoming on the trunk line 132. Alternatively, when a call is received from the PBX 126 via the PSTN 114, a caller ID of the incoming call is cross-referenced to a list of numbers (stored in the MSC 102) that identify the incoming call as being initiated at the PBX 126.

In an operation according to the present invention, a call is received by MSC 102 ("originating MSC") from the PBX 126 and intended for mobile unit 112. In such case, the MSC 102 recognizes the call as having been initiated at a terminal, e.g., 128 or 130, coupled to the PBX 126 because either the call came into the MSC 102 on the trunk line 132 coupled or because the caller ID is associated with the PBX 126.

The MSC 102 then sends a locate request to the HLR 110. According to the present invention, a PBX termination access type is appended to the locate request that is sent to the HLR 110. The HLR 110 receives the locate request from the MSC 102 and retrieves subscriber and current information for the mobile unit 124.

In a first mode of operation, the current information for the mobile unit indicates that calls originating at the PBX 126 are to be delivered but that all other calls are not to be delivered. In such case, since the call was originated at the PBX 126, the HLR 110 sends a route request to the serving MSC 116. This route request will include a Termination Access Type that indicates the call originated at a PBX. Further, the route request may specify the ringing cadence that will be used in an Alert Code parameter. The serving MSC 116 receives the route request and responds to the HLR 110 with a route request response. The HLR 110 then responds to the MSC 102. Responsively, the MSC 102 and the MSC 116 setup the call to the mobile unit 124. In setting up the call, the serving MSC 116 alerts the mobile unit according to the ringing cadence specified in the Alert Code parameter.

In a second mode of operation, all calls are delivered to the mobile unit 126. However, for those calls that originate at the PBX 126, a distinctive ringing signal (alert) is provided to the mobile unit 126. The distinctive ringing to be employed may have been specified in the Alert Code parameter in the Route Request sent to the serving MSC 116. However, in another operation, based upon the Termination Access Type specified as being a PBX, the serving MSC 116 by default uses a distinctive ringing to alert the mobile unit 126. Such distinctive ringing alerts the user of the mobile unit 124 that the call originated at the PBX 126. The user of the mobile unit 124 may then elect to either accept the call or to reject the call with the knowledge that a user of the PBX 126 initiated the call.

Figure 2:
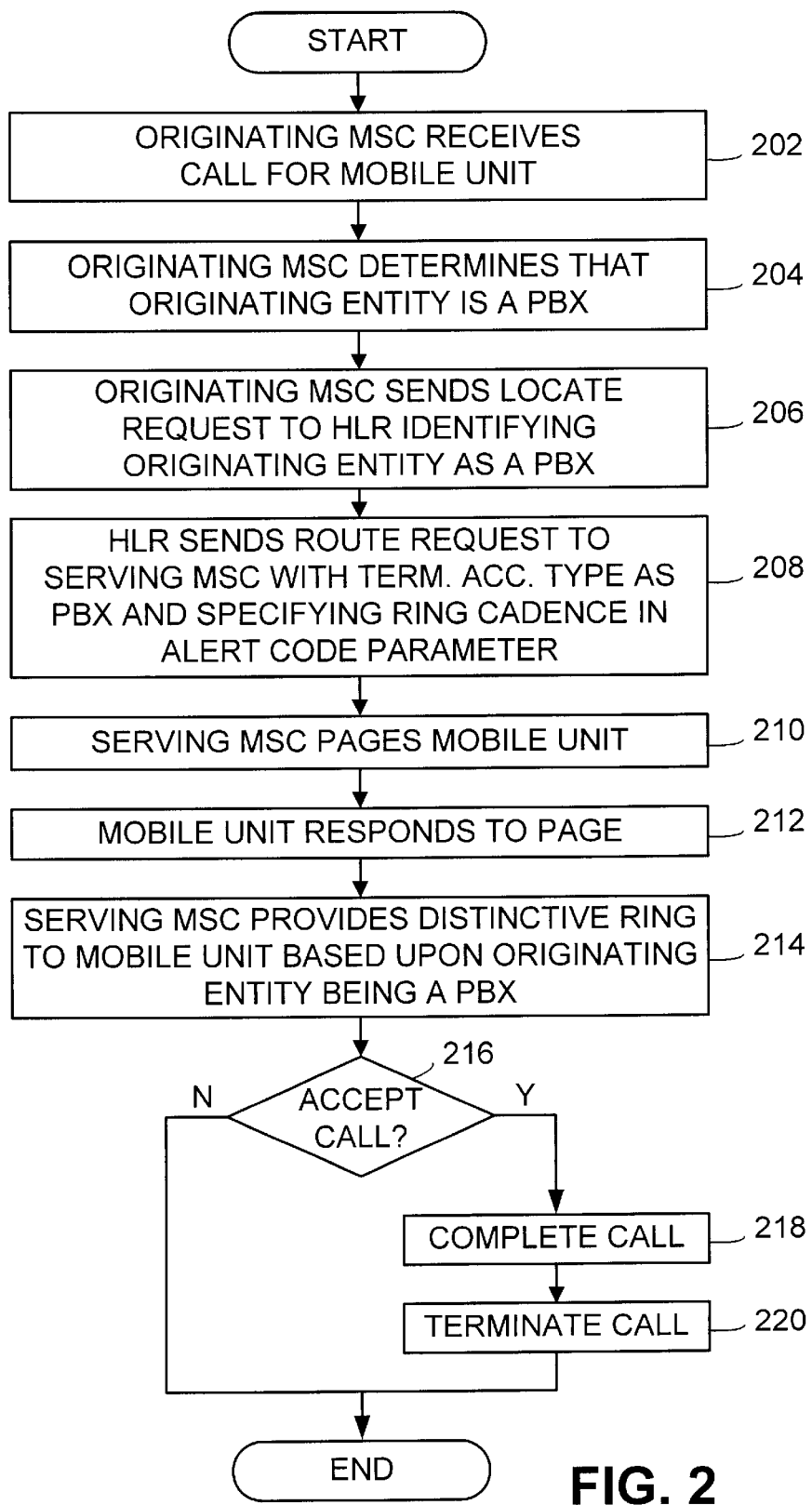
FIG. 2 is a logic diagram illustrating operation of a wireless communication system according to the present invention in which the wireless communication system selectively routes a call received from a private branch exchange to a mobile unit and provides a distinctive alert when routing to the mobile unit is selected.

FIG. 2 is a logic diagram illustrating operation of a wireless communication system according to the present invention in which the wireless communication system selectively routes a call received from a private branch exchange to a mobile unit and provides a distinctive alert in such routing. At step 202, an originating MSC receives a call intended for a mobile unit serviced by the MSC. At step 204, the originating MSC determines that the originating entity of the call is a PBX. As was described with reference to FIG. 1, the originating MSC may make such a determination based upon the trunk or trunk group on which the call is received or may make the determination based upon a caller ID of the call.

At step 206, the originating MSC sends a locate request to the HLR serving the mobile unit. In the locate request, the originating MSC identifies the call as having been originated at a PBX via a Termination Access Type parameter. Next, at step 208, the HLR sends a route request to a serving MSC identifying the originating entity as a PBX in the Termination Access Type parameter. In the route request, the HLR may also specify the ring cadence to be used in alerting the mobile unit that the call originated from a PBX, such ring cadence having been specified in the HLR record for the mobile unit.

When the call does not originate from a PBX, the HLR does not identify the originating entity as a PBX in the route request. In such case, the Termination Access Type parameter is set according to the type of originating entity. Further, the ring cadence specified in the Alert Code parameter in the route request will be set according to the type of originating entity.

Next, at step 210, the serving MSC pages the mobile unit. At step 212, the mobile unit responds to the page. Then, at step 214, the serving MSC provides a distinctive ringing to the mobile unit (alert signal) based upon the originating entity being a PBX, such ringing cadence having been specified in the Alert Code parameter. At step 216, based upon the distinctive ringing, the user of the mobile unit may either accept the call or reject the call (by not answering). If the user accepts the call, operation proceeds to step 218 where the call is completed to the mobile unit. The call is then serviced until it is terminated at step 220 by either the mobile unit or the originating entity. From step 220, and from step 216 if the call is not accepted, operation ends.

Figure 3:
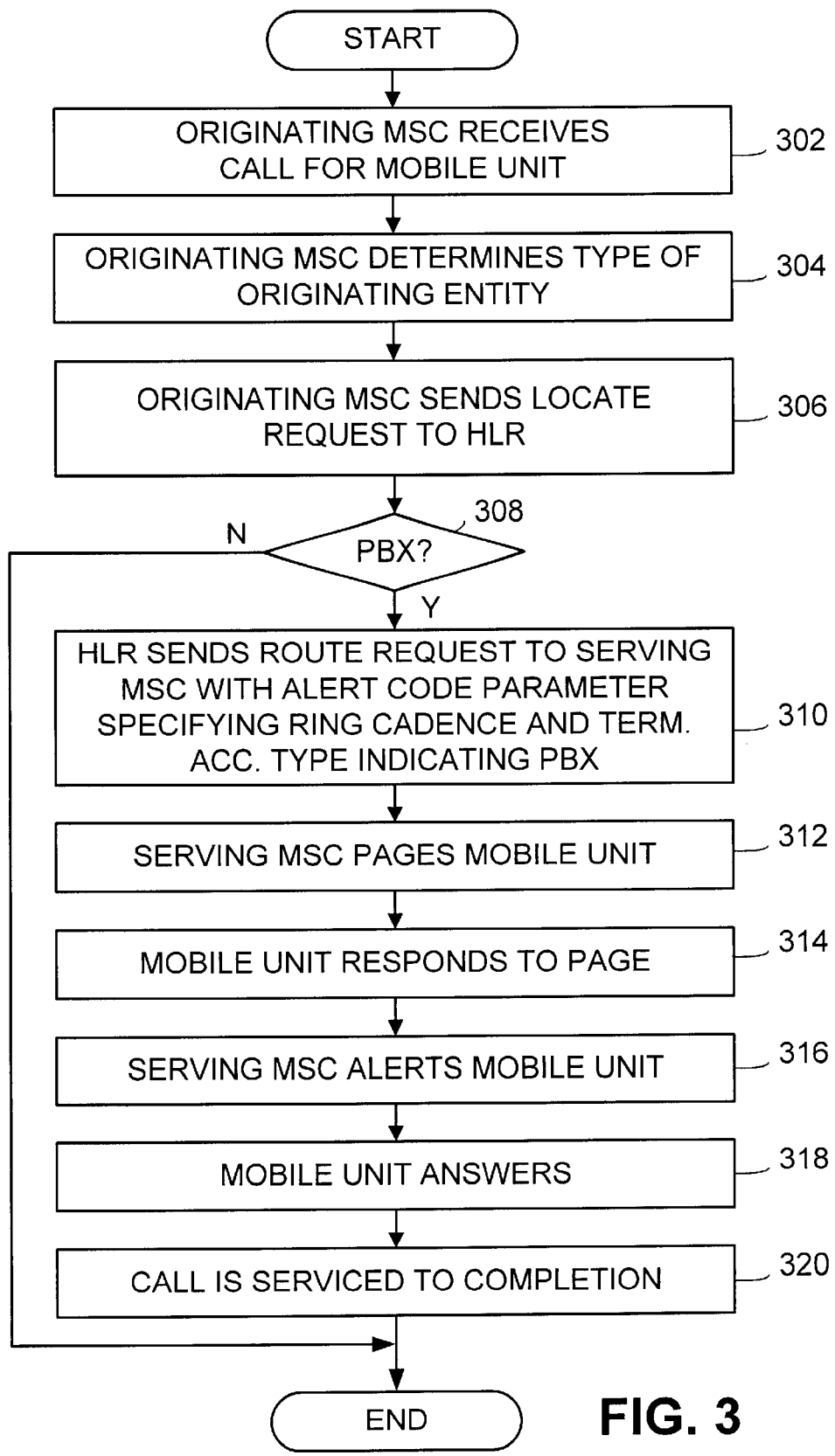
FIG. 3 is a logic diagram illustrating operation of a wireless communication system according to the present invention in which a call is selectively routed to a mobile unit based upon whether the source of the call is a private branch exchange.

FIG. 3 is a logic diagram illustrating operation of a 20 wireless communication system according to the present invention in which a call is selectively routed to a mobile unit based upon whether the source of the call is a PBX. Operation commences at step 302 where an originating MSC receives a call for a mobile unit. At step 304, the 25 originating MSC determines the originating entity type. Then, at step 306, the originating MSC sends a locate request to the HLR, appending the originating entity type to the locate request. At step 308, the HLR determines whether the originating entity type is a PBX based upon the contents of the locate request.

If the originating entity type is not a PBX, as determined at step 308, operation ends and the call is not delivered. In such case, the call may be sent to voice mail or another messaging system. In an alternate embodiment of the operations of FIG. 3, if it is determined at step 308 that the originating entity is not a PBX, normal call delivery is performed. Normal call delivery operations are known.

If the originating entity type is a PBX, operation proceeds to step 310 where the HLR sends a route request to a serving MSC. Contained in the route request is a Termination Access type parameter that specifies that the originating entity is a PBX. Further contained in the route request is an Alert Code parameter that specifies a distinctive ringing to be employed in alerting the mobile unit upon delivering the call. The serving MSC then pages the mobile unit at step 312. The mobile unit responds to the page at step 314 and the serving MSC alerts the mobile unit at step 316 using the specified distinctive ringing. In an alternate embodiment of the operation of FIG. 3, because only calls that were originated at the PBX are delivered, no distinctive ringing is employed. The mobile unit answers at step 318 and the call is serviced until completion at step 320. From step 320, operation ends.

Figure 4A:
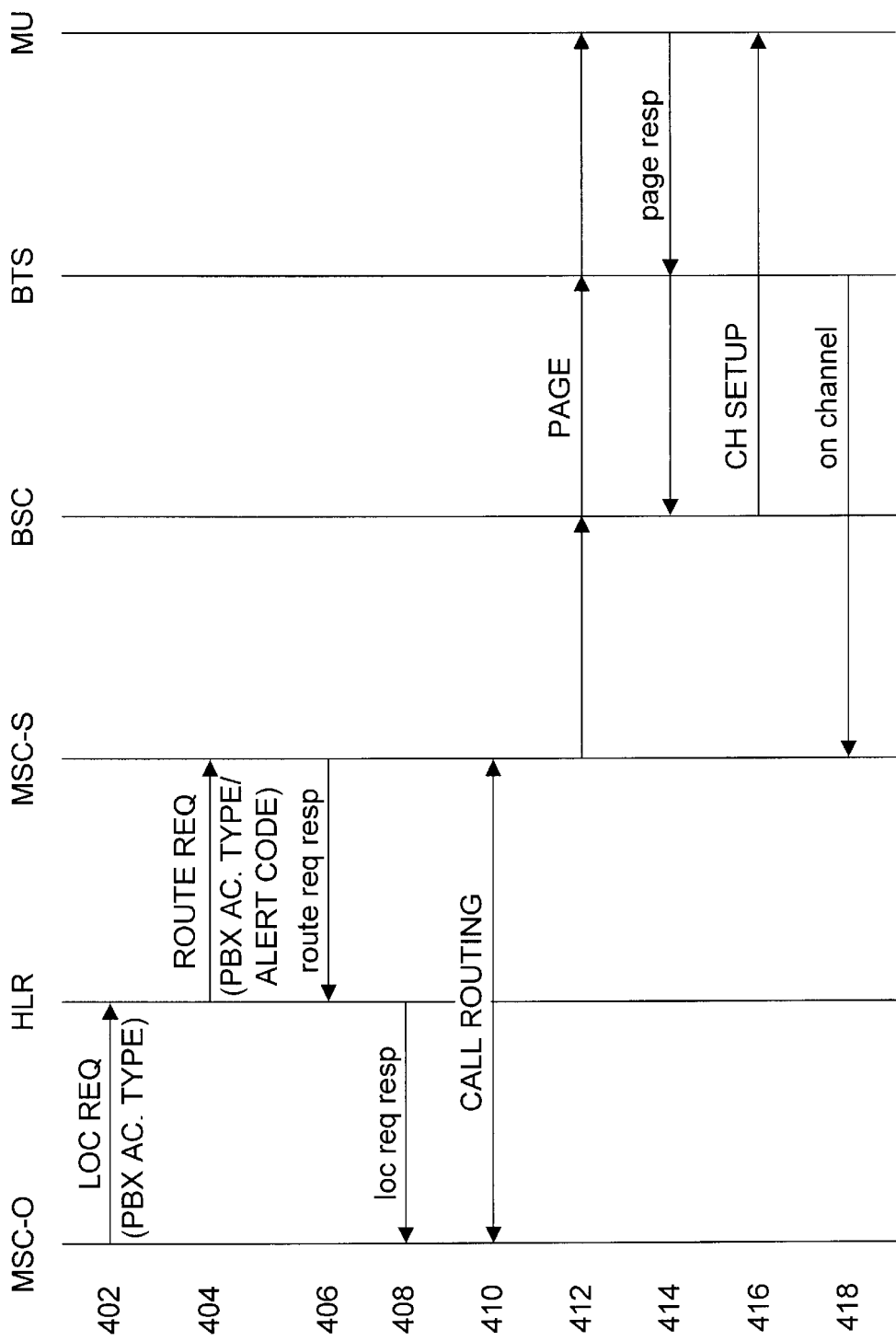
FIGS. 4A and 4B are message flow diagrams illustrating the flow of messages among an originating mobile switching center, a home location register, a serving mobile switching center, a base station controller, a base station and a mobile unit according to the present invention.
Figure 4B:
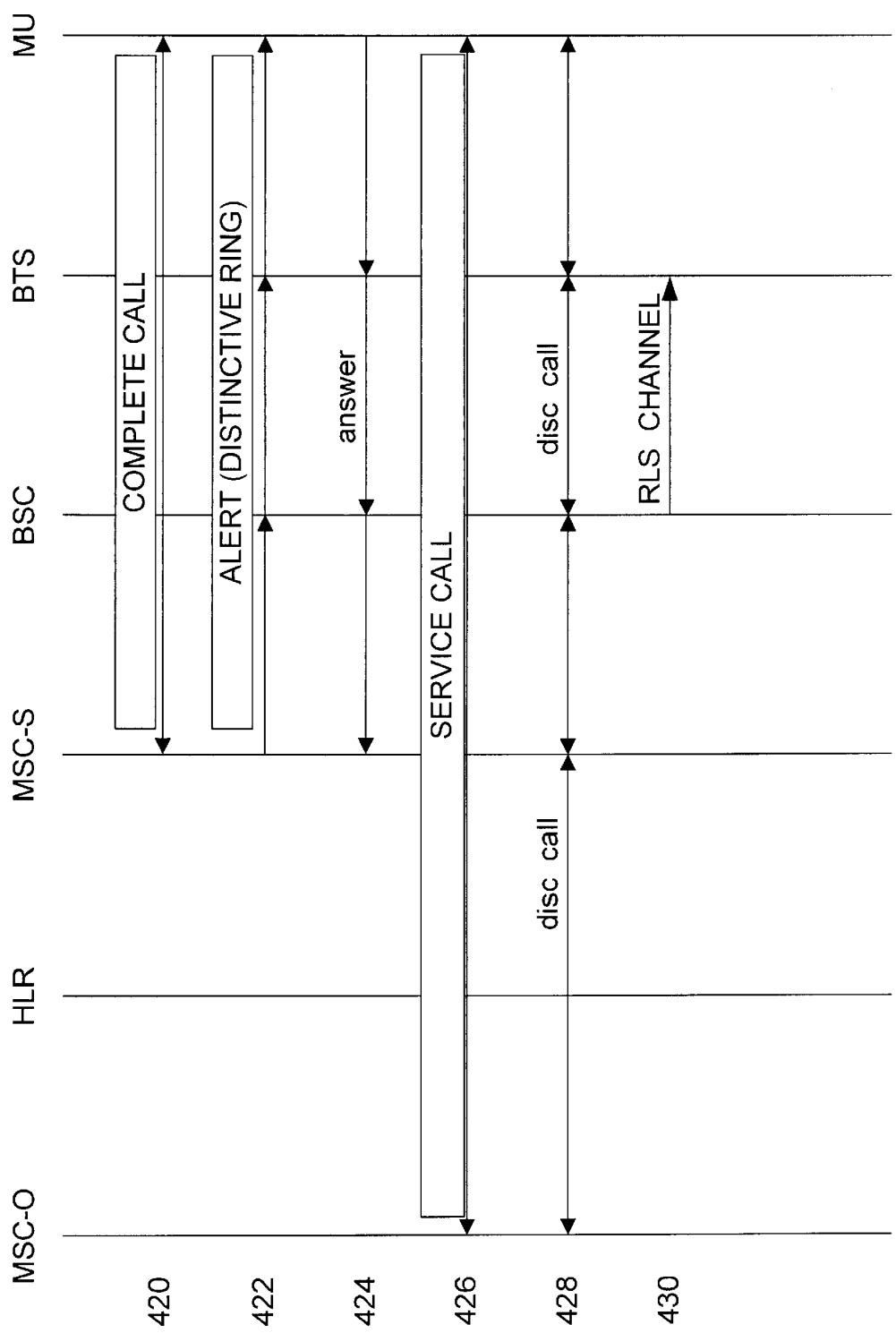

FIGS. 4A and 4B are message flow diagrams illustrating the flow of messages among an originating mobile switching center, a home location register, a serving mobile switching center, a base station controller, a base station and a mobile unit according to the present invention in receiving and routing a call. At 402, the originating MSC has received a request to terminate a call to a mobile unit based upon a call request and, in response, sends a locate request to a serving HLR. The locate request sent at 402 includes information indicating that the originating access type is a PBX. As is generally known, the last known location of the mobile unit (identifying the serving MSC) is stored in the HLR and accessed in response to the locate request.

In response to the locate request, The HLR then sends a route request to the serving MSC which includes the PBX access type at 404. This route request includes a termination access type that identifies the originating entity as a PBX. Further, the route request may include an Alert Code parameter that specifies a distinctive alert code to be employed in alerting the mobile unit. This distinctive alert code was determined based upon the subscriber record for the mobile unit stored in the HLR.

In response to the route request, at 406, the serving MSC responds to the HLR with a route request response. The HLR then sends a locate request response to the originating MSC at 408, such locate request response identifying the serving MSC. At 410, the originating MSC and the serving MSC perform call routing to service the call. The serving MSC then sends a page to the mobile unit via at least one BSC and at least one base station transceiving subsystem (BTS) at 412. At 414, the mobile unit responds to the page with a page response. Such page response is relayed via a servicing BTS to a servicing BSC. The servicing BSC then coordinates the allocation and setup of a channel to the mobile unit at 416. Subsequently, the servicing BTS sends an on channel message to the serving MSC via the servicing BSC at 418.

Referring now to FIG. 4B, the serving MSC completes the call to the mobile unit at 420. Then, the serving MSC sends an alert to the mobile unit via the servicing BSC and servicing BTS at 422, such alert signal causing the mobile unit to ring. Based upon the originating terminal type being a PBX, a distinctive ring may be provided to the mobile unit. The user of the mobile unit may answer the alert at 424 via the servicing BTS and the servicing BSC by accepting the call. Once these steps are complete, the call is serviced at 426 until either the mobile unit or the originating party disconnects. At 428, either the mobile unit or the originating party initiates disconnection of the call. Then, at step 430, the servicing BSC initiates the release of the channel at 430.

The invention disclosed herein is susceptible to various modifications and alternative forms. Specific embodiments therefor have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A method of operating a wireless communication system, the method comprising:
  receiving a call intended for a mobile unit serviced by the wireless communication system;
  determining by a mobile switching center of the wireless communication system that the call originated from a private branch exchange;
  completing the call to the mobile unit; and
  providing a distinctive alert signal to the mobile unit to indicate that the call originated from the private branch exchange.

2. The method of claim 1, wherein determining whether the call originated from the private branch exchange is based upon whether the call was received on a trunk line associated with the private branch exchange.

3. The method of claim 1, wherein determining whether the call originated from the private branch exchange is based upon a caller ID of the call.

4. The method of claim 1, wherein determining that the call originated from the private branch exchange is determined by an originating mobile switching center of the wireless communication system.

5. The method of claim 1, wherein calls originating from other than the private branch exchange are not delivered to the mobile unit.

6. A method of operating a wireless communication system, the method comprising:
   receiving a call intended for a mobile unit serviced by the wireless communication system;
   determining whether by a mobile switching center of the wireless communication system the call originated from a private branch exchange;
   when the call originated from the private branch exchange, completing the call to the mobile unit; and
   when the call did not originate from the private branch exchange, not completing the call to the mobile unit.

7. The method of claim 6, wherein determining whether the call originated from the private branch exchange is based upon whether the call was received on a trunk line associated with the private branch exchange.

8. The method of claim 6, wherein determining whether the call originated from the private branch exchange is based upon a caller ID of the call.

9. The method of claim 6, wherein determining whether the call originated from the private branch exchange is determined by an originating mobile switching center of the wireless communication system.

10. A wireless communication system comprising:
    an originating mobile switching center that receives a call intended for a mobile unit serviced by the wireless communication system, the originating mobile switching center determining whether the call originated from a private branch exchange;
    a home location register that stores location information for the mobile unit; and
    a serving mobile switching center;
    the originating mobile switching center and the serving mobile switching center completing the call to the mobile unit; and
    the serving mobile switching center providing a distinctive alert signal to the mobile unit to indicate that the call originated from the private branch exchange.

11. The wireless communication system of claim 10, wherein the originating mobile switching center determines whether the call originated from the private branch exchange based upon whether the call was received on a trunk line associated with the private branch exchange.

12. The wireless communication system of claim 10, wherein the originating mobile switching center determines whether the call originated from the private branch exchange based upon a caller ID of the call.

13. The wireless communication system of claim 10, wherein the home location register does not deliver calls originating from other than the private branch exchange to the mobile unit.

14. The wireless communication system of claim 10, further comprising:
    at least one base station controller coupled to the originating mobile switching center;
    at least one base station coupled to the at least one base station controller coupled to the originating mobile switching center;
    at least one base station controller coupled to the serving mobile switching center; and
    at least one base station coupled to the at least one base station controller coupled to the serving mobile switching center.

15. A wireless communication system comprising:
    an originating mobile switching center that receives a call intended for a mobile unit serviced by the wireless communication system and that determines whether the call originated from a private branch exchange;
    a home location register that stores location information for the mobile unit and that initiates completion of the call to the mobile unit when the call originated from the private branch exchange; and
    the originating mobile switching center and the serving mobile switching center completing the call to the mobile unit when the call originated from the private branch exchange.

16. The wireless communication system of claim 15, wherein determining whether the call originated from a terminal connected to a private branch exchange is based upon whether the call was received on a trunk line associated with the private branch exchange.

17. The wireless communication system of claim 15, wherein determining whether the call originated from a terminal connected to a private branch exchange is based upon a caller ID of the call.

18. The wireless communication system of claim 15, further comprising:
    at least one base station controller coupled to the originating mobile switching center;
    at least one base station coupled to the at least one base station controller coupled to the originating mobile switching center;
    at least one base station controller coupled to the serving mobile switching center; and
    at least one base station coupled to the at least one base station controller coupled to the serving mobile switching center.

19. The wireless communication system of claim 15, wherein determining whether the call originated from the private branch exchange is determined by the originating mobile switching center.

20. The wireless communication system of claim 15, wherein calls originating from other than the private branch exchange are not delivered to the mobile unit.

21. A method of operating a wireless communication system, the method comprising:
    receiving a call intended for a mobile unit serviced by the wireless communication system;
    determining by a component of the wireless communication system, based upon an identification of a source of the call, whether the call originated from a private branch exchange;
    when the call originated from the private branch exchange, completing the call to the mobile unit; and
    when the call did not originate from the private branch exchange, not completing the call to the mobile unit.

* * * * *